United States Patent

Hsu

Patent Number: 5,818,973
Date of Patent: Oct. 6, 1998

[54] APPARATUS FOR DIGITAL CORRECTION IN AN IMAGE SYSTEM

[75] Inventor: Chuan Yu Hsu, Hsinchu, Taiwan

[73] Assignee: Umax Data Systems Inc., Hsinchu, Taiwan

[21] Appl. No.: 584,532

[22] Filed: Jan. 11, 1996

[51] Int. Cl.⁶ .............................. G06T 5/00; G06T 5/40; H04N 1/409; G06K 9/44

[52] U.S. Cl. .................... 382/260; 382/266; 382/274; 382/168; 382/264; 358/445; 358/446; 358/447; 358/461

[58] Field of Search ................... 382/264, 275, 382/274, 254, 260, 266, 168; 358/461, 463, 445, 446, 447; 341/139

[56] References Cited

U.S. PATENT DOCUMENTS 5,561,724  10/1996  Kido et al. .................... 382/264

*Primary Examiner*—Scott Rogers
*Attorney, Agent, or Firm*—Christensen, O'Connor, Johnson & Kindness PLLC

[57] ABSTRACT

An apparatus for digital correction in an image system is disclosed. The present invention comprises pre-processing means for automatically adjusting dc gain of an image signal; an analogue-to-digital converter for converting the adjusted image signal to a digital signal; bit-enhancing means for generating a bit-enhanced signal; and post-processing means for generating an image code by processing the bit-enhanced signal through highlight, shadow, Gamma and shading correction. The present invention provides an improved apparatus for correcting the photo-response non-uniformity, avoiding image defect, without sacrificing the accuracy of the image system.

19 Claims, 5 Drawing Sheets

| $a_{11}$ | $a_{12}$ | $a_{13}$ |
|---|---|---|
| $a_{21}$ | $a_{22}$ | $a_{23}$ |
| $a_{31}$ | $a_{32}$ | $a_{33}$ |

FIG.5a

| $a_1$ | $a_2$ | $a_3$ |
|---|---|---|

FIG.5b

| $a_0$ | $a_1$ | $a_2$ | $a_3$ | $a_4$ |
|---|---|---|---|---|

FIG.5c

APPARATUS FOR DIGITAL CORRECTION IN AN IMAGE SYSTEM

BACKGROUND OF THE INVENTION

1. Field of the Invention

The present invention relates to an image system, and more particularly to an apparatus for digital correction in an image system to improve efficiency in image taking, avoid resulting in false contour or image defect, and reduce manfacturing cost while the accuracy of digital information is not compromised. compromise the system bits of accuracy.

Generally the present invention provides an apparatus for taking image, storing image code, displaying image, and correcting pixel by such methods such as shading, highlight, shadow and Gamma correction.

In addition to processing image of high contrast, e.g. a text, the present invention is highly suitable for processing non-text image, e.g. a painting or a photograph, and is applicable for scanning an image.

2. Description of the Prior Art

An image system makes use of focusing a reflecting light beam through a photodetector to generate an image signal which is further image processed, stored or displayed. Among the widespread applications, image scanners, camera recorders or facsimile machines are common in modern offices and homes. In spite of somewhat difference among these machines, there are two primary types of image systems in the prior art, i.e., analogue correction system and digital correction system.

A functional block diagram of a conventional analogue correction in an image system is shown in FIG. 1. It comprises a light source 10, a mirror 11, a lens 12, a charge-coupled device(CCD) 13, a pre-processing means, which is implemented by a direct current(dc)-gain voltage amplifier 14, an analogue-to-digital converter(ADC) 15, a digital-to-analogue(DAC) 16, a post-processing means 17 and a buffer 18. In the operation, light beam from the light source 10 is reflected from the surface of a text or a picture, and is further reflected by the mirror 11 the tight beam is focused by the lens 12, and then is converted to an image signal by the CCD 13. The dc gain of the image signal is automatically adjusted by the dc-gain voltage amplifier 14. The image signal is wherein-reference and then fed to the ADC 15, voltage(Vref) 19 is changed in according to same correction vector to the DAC 16, because of the light source 10, the mirror 11, the lens 12 or the CCD 13 possesses non-uniform response, which is formally called PhotoResponse Non-Uniformity(PRNU) contrast adjustment by a Gamma vector is carried out through the post-processing means 17, and the image signal then is stored in buffer 18 for further image processing or displaying.

There are some drawbacks associated with above typical analogue correction system (1) when system bits in ADC 15 increase, the bits in DAC 16 vary accordingly, thereby slowing down the whole system due to its high equivalent impedance, (2) for using a DAC 16 having more bits, the manufacturing cost grows and the availability becomes lower; (3) Adjustment of reference voltage 19 of ADC 15 through DAC 16 will slow down the ADC 15 due to long settling time of the DAC 16; (4) The fluctuating reference voltage 19 will bring in noise, further destabilizing the whole system.

A functional block diagram of a digital correction system is shown in FIG. 2. The major difference between this and the previous system is the replacement of the DAC 16 in FIG. I by a divider 26 in FIG. 2 for correcting an adjusted image signal from an ADC 25. Although the digital correction system eliminates the drawbacks mentioned above, the use of the divider 26 decreases the accuracy in bits of the system, resulting in false contour or image defect. For example, supposing the system accuracy in bits is 8 and the photo-response non uniformity(PRNU) is 50%, the system accuracy will decrease by one after performing shading correcting through the divider 26, and will further decrease by two after performing highlight correcting to 25% of its full range. As a result, there are 32, i.e. $2^5$, gray level instead of 256, i.e. $2^8$, and this loss in gray level appears as discontinuities in a histogram as shown in FIG. 3b compared with an original histogram shown in FIG. 3a. From visual expression, there are some noticeable image defects appearing on, for example, a photograph.

SUMMARY OF THE INVENTION

It is therefore a primary object of this invention to provide an improved apparatus for digital correction in an image system to improve efficiency in image taking, avoid bring in noise, and reduce manufacturing cost.

It is a further object of the invention to provide an improved apparatus for correcting the photo response non-uniformity(PRNU), avoiding image defect, the accuracy of digital information.

Accordingly, the present invention provides an apparatus for digital correction in an image system which comprises electrically converting means for converting image to an image signal; pre-processing means for automatically adjusting the dc gain of the image signal; an analogue-to-digital converter for converting the adjusted image signal to a digital signal; bit-enhancing means for generating a bit-enhanced signal; post-processing means for generating an image code by processing the bit-enhanced signal through highlight, shadow, Gamma and shading correction; and a buffer for storing the image code for further image processing or displaying.

BRIEF DESCRIPTION OF THE DRAWINGS

FIG. 5a is the calculating method of bit-enhancing means with dimension 3×3.

FIG. 5b is the calculating method of bit-enhancing means with dimension 1×3.

FIG. 5c is the calculating method of bit-enhancing means with dimension 1×5.

DESCRIPTION OF THE PREFERRED EMBODIMENT

Figure 1:
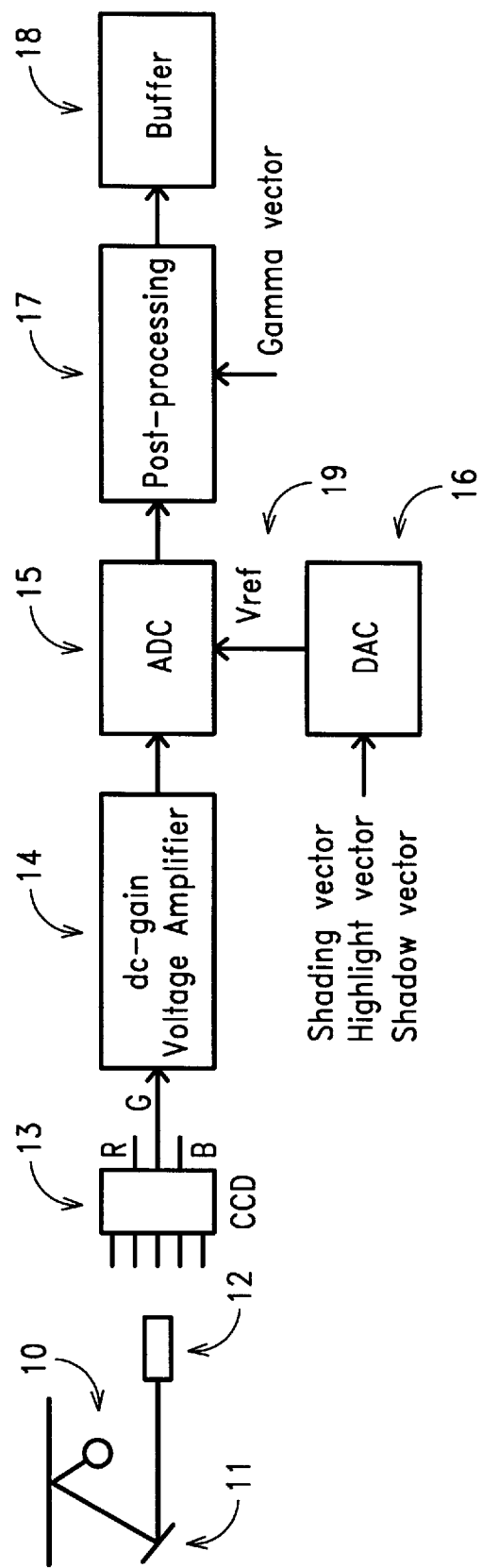
FIG. 1 is a functional block diagram of a typical analogue correction in an image system.
Figure 2:
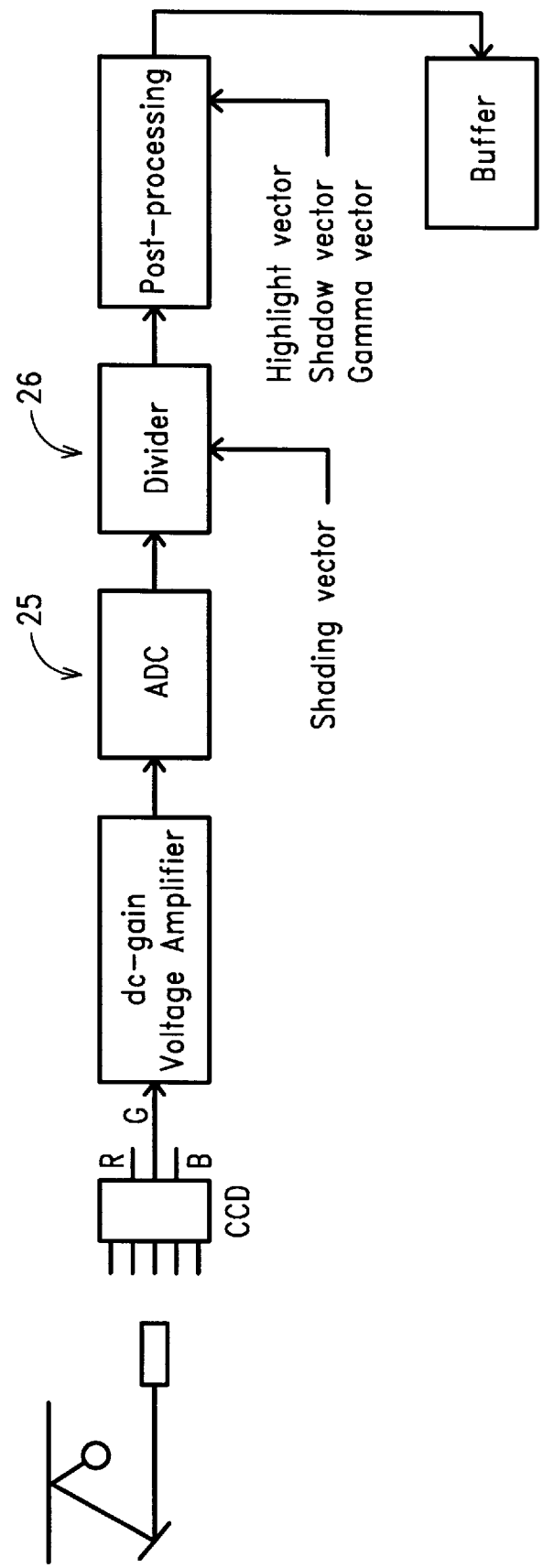
FIG. 2 is a functional block diagram of a typical digital correction in an image system.
Figures 3A, 3B:
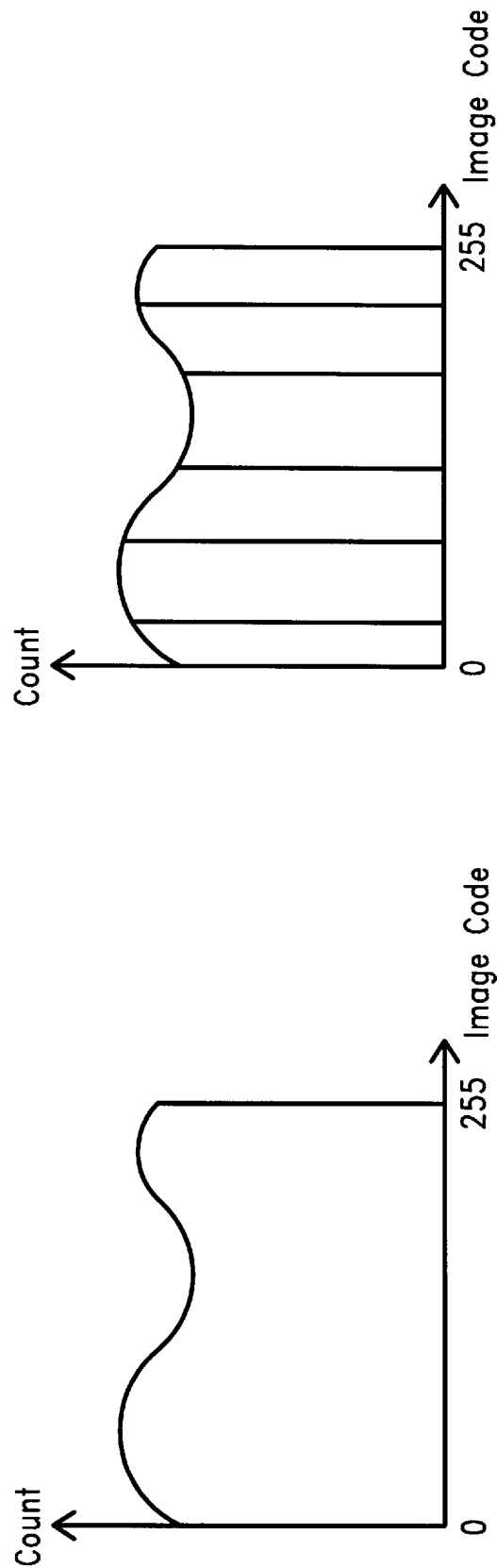
FIG. 3a is a normal histogram of image codes.
FIG. 3b is a histogram of image codes resulted from the system of FIG. 2.
Figure 4:
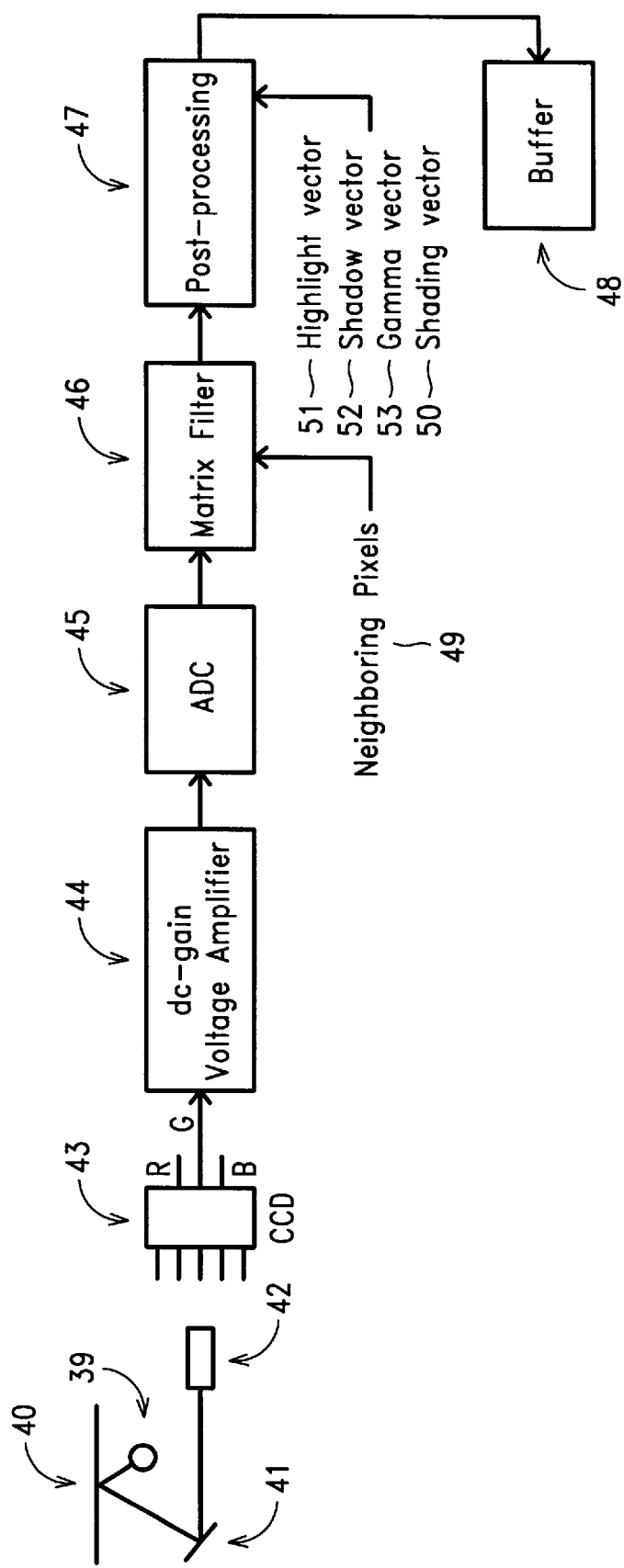
FIG. 4 is a functional block diagram of the present invention.

A functional block diagram of the present invention is shown in FIG. 4. It comprises a light source 39, a mirror 41, a lens 42, a charge-coupled device(CCD) 43, a pre-processing means, which is implemented by a dc-gain voltage amplifier 44, an analogue-to-digital converter(ADC)

45, a bit-enhancing means, which is implemented by a matrix filter 46, a post-processing means 47 and a buffer 48. In the operation, light beam from the light source 39 is reflected from the surface of a text or a picture 40, and is further reflected by the mirror 41. The light beam is focused by the lens 42, and then is converted to an image signal by the CCD 43. In order to compensate for fluctuation of the image signal or aging of the CCD 43, then gain of the image signal is automatically adjusted by the dc-gain voltage amplifier 44. The image signal is then fed to the ADC 45 for converting the adjusted image signal to a digital signal.

The matrix filter 46, featuring in this invention, is used for generating a bit-enhanced signal by performing on the digital signal and neighboring pixels 49, and is designed to increase the accuracy of the digital image signal, and avoid a decrease of system accuracy by the digitization in the ADC 45. First example of the calculating method as shown in FIG. 5$a$ is for matrix filter 46 having dimension 3×3. The generating a bit-enhanced signal in this example is performed in the following steps:(a) calculating a first average of eight neighboring pixels around $a_{22}$; and (b) calculating a second average of the first average and the pixel $a_{22}$. By the steps described above, the system accuracy in bits increases by four, and are sufficient in compensating the loss of accuracy in the following corrections, thereby reducing image defect. Owing to the no despread use of the linear CCD to simplify the system and reduce manufacturing cost, the second example of the calculating method as shown in FIG. 5$b$ is used, wherein the matrix filter 46 has dimension 1×3. The steps of generating a bit-enhanced signal in this second example are similar to those of FIG. 5$a$ except an average of two neighboring pixels around $a_2$ instead of is calculated averaging eight neighboring pixels. Consequently, increasing two system bits instead of four are added. The third example shown in FIG. 5$c$ demonstrates the steps of generating a bit-enhanced signal by calculating a weighted average, for example, $(0.5 \times a_0 + a_1 + a_3 + 0.5 \times a_4) \div 3$, wherein 0.5 is a weight coefficient. An average of the weighted average and the pixel $a_2$ is then calculated.

The bit-enhanced signal is then fed to the post-processing means 47, which is implemented by a divider/multiplier in this embodiment. Owing to the photo-response non-uniformity(PRNU) in the mirror 41, the lens 42, the CCD 43, or the light source 39, the image system in an image scanner is constructed to scan a white board before practicing and the scanned pixels are stored as shading vector 50 for later use. Furthermore, highlight vector 51, shadow vector 52 or Gamma vector 53 could be fed optionally to the post-processing means 47 to correct the bit-enhanced signal and generate an image code, which is then fed to the buffer 48 for further image processing or displaying.

Accordingly, the present invention provides an apparatus that eliminates the drawbacks such as system slowness, high manufacturing cost, noise-prone and image defect. Although specific embodiments have been illustrated and described it will be obvious to those skilled in the art that various modification, such as variation of the dimension of the matrix filter and weight coefficient, may be made without departing from the spirit which is intended to be limited solely by the appended claims.

What is claimed is:

1. An apparatus for digital correction in an image system comprising:

pre-processing means for adjusting a dc gain of an image signal;

an analogue-to-digital converter for converting the adjusted image signal to a digital signal;

bit-enhancing means for generating a bit-enhanced signal according to the digital signal and a plurality of neighboring pixels; and post-processing means for generating an image code by processing the bit-enhanced signal through shading, highlight, shadow, and Gamma correction.

2. The apparatus according to claim 1, wherein said pre-processing means is a DC-gain voltage amplifier.

3. The apparatus according to claim 1, wherein said bit-enhancing means further performs calculating for generating said bit-enhanced signal.

4. The apparatus according to claim 3, wherein said bit-enhancing means is a matrix filter having dimension m×n, wherein m and n are positive integers.

5. The apparatus according to claim 4, wherein said matrix filter has dimension 3×3.

6. The apparatus according to claim 5, wherein said matrix filter performs calculating which comprises the steps of:

(a) calculating a first average of the eight neighboring pixels; and (b) generating said bit-enhanced signal by calculating a second average of the first average and the value of said digital signal.

7. The apparatus according to claim 4, wherein said matrix filter has dimension 1×3.

8. The apparatus according to claim 1, wherein said post-processing means is a divider.

9. The apparatus according to claim 1, wherein said post-processing means is a multiplier.

10. The apparatus according to claim 1, wherein said post-processing means is further responsive to a shading vector for correcting shading phenomenon.

11. The apparatus according to claim 1, wherein said post-processing means is further responsive to a Gamma vector for correcting contrast of image.

12. The apparatus according to claim 1, wherein said post-processing means is further responsive to a highlight vector.

13. The apparatus according to claim 1, wherein said post-processing means is further responsive to a shadow vector.

14. The apparatus according to claim 1, further comprising a buffer for storing said image code.

15. The apparatus according to claim 1, further comprising a converting means for converting an image to said image signal.

16. The apparatus according to claim 15, wherein said converting means comprises at least one charge-coupled device.

17. An apparatus for digital correction in an image system comprising:

charge-coupled device for converting an image to an image signal;

a dc-gain voltage amplifier for adjusting dc gain of the image signal to compensate for fluctuation of the image signal or aging of the charge-coupled device;

an analogue-to-digital converter for converting the adjusted image signal to a digital signal;

a matrix filter having dimension m×n, wherein m and n are positive integers, for generating a bit-enhanced signal according to the digital signal and a plurality of neighboring pixels;

post-processing means for generating an image code by processing the bit-enhanced signal responsive to a shading vector, a Gamma vector, a highlight vector, and a shadow vector; and a buffer for storing the image code.

18. The apparatus according to claim 17, wherein said matrix filter has dimension 3×3, and said matrix filter performs calculation which comprises the steps of:

(a) calculating a first average of the eight neighboring pixels; and (b) generating said bit-enhanced signal by calculating a second average of the first average and the value of said digital signal.

19. The apparatus according to claim 17, wherein said post-processing means is a divider or a multiplier.

* * * * *